United States Patent [19]

Kubo

[11] Patent Number: 4,734,153

[45] Date of Patent: Mar. 29, 1988

[54] APPARATUS FOR WINDING MAGNETIC TAPE INTO CASSETTES

[75] Inventor: Toyohide Kubo, Tokushima, Japan

[73] Assignee: AWA Engineering Co., Ltd., Tokushima, Japan

[21] Appl. No.: 911,983

[22] Filed: Sep. 26, 1986

[30] Foreign Application Priority Data

Oct. 9, 1985 [JP] Japan ................................. 60-225889
Oct. 9, 1985 [JP] Japan ................................. 60-225890

[51] Int. Cl.⁴ ........................ B31F 5/06; B65H 21/00
[52] U.S. Cl. .................................. 156/502; 156/159; 242/56 R; 242/58.1
[58] Field of Search .................. 156/157, 159, 304.3, 156/502, 505, 506; 242/56 R, 58.4, 58.1

[56] References Cited

U.S. PATENT DOCUMENTS

| | | | |
|---|---|---|---|
| 3,737,358 | 6/1973 | King | 156/502 |
| 3,825,461 | 7/1974 | Gorman | 156/502 |
| 4,175,999 | 11/1979 | Schoettle | 156/505 |
| 4,486,262 | 12/1984 | Woodley | 156/502 |

Primary Examiner—Michael Wityshyn
Attorney, Agent, or Firm—Wenderoth, Lind & Ponack

[57] ABSTRACT

An apparatus for winding magnetic tape into a cassette positions and holds a cassette case, extracts and retains leader tape, cuts and splices leader tape to magnetic tape, and winds magnetic tape onto a hub inside the cassette. After a given amount of magnetic tape has been wound on that hub, the magnetic tape is retained, cut, spliced to leader tape, and the extracted slack tape is wound into the cassette case. Leader tape is extracted by extraction guides or rollers that move from a standby position within the cassette case front cavity to a position for winding magnetic tape. The magnetic tape winding position is such that leader tape, extracted to that position, is pulled away fron one of the cassette's internal tape guides, and during the magnetic tape winding process one extraction guide doubles as a tape tracking guide. Magnetic tape can be wound evenly, at high speeds and without damage by avoiding contact with the cassette's internal tape guide.

2 Claims, 9 Drawing Figures

APPARATUS FOR WINDING MAGNETIC TAPE INTO CASSETTES

BACKGROUND OF THE INVENTION

1. Field of the Invention

This invention relates to apparatus as for winding magnetic tape into cassette cases with guard panels, and especially relates to apparatuses which extract leader tape from a cassette case, connect magnetic tape between the leader tape, and wind the tape onto a hub inside the cassette case.

2. Description of the Related Art

There are two basic production methods for magnetic recording tape cassettes. The first method involves loading cassette cases with reel hubs which have already been wound with magnetic tape outside the case. This method requires a large complex apparatus, but the magnetic tape winding time is short, and the processing rate is high. This method is suitable for large scale production facilities.

In the second method, cassettes are prepared by loading reel hubs joined by a length of leader tape into cassette cases. Leader tape is extracted from each cassette case, magnetic tape is connected to the leader tape, and a hub is rotated to wind magnetic tape into the cassette case. This method has a characterisitc in that it can be performed with a small simple apparatus. An apparatus which winds magnetic tape by the second method is described in Japanese Patent Publication No. 45203/1977. In this apparatus, as shown in FIG. 9, leader tape 92 is extracted from the cassette case 91, and attached to the first 93 and second 94 tape retainers. The leader tape 92 is cut between the first 93 and second 94 tape retainers to which it is attached, and the third tape retainer 95, which moves as a unit with the second tape retainer 94, and holds magnetic tape 96, is moved next to the first tape retainer 93. Magnetic tape 96 is connected to the end of the leader tape 92, the tape is released from the first 93 and third 95 tape retainers, and the hub inside the cassette case is rotated to wind up the tape. After a given length of magnetic tape 96 has been wound, it is again attached to, and cut between, the first 93 and third 95 tape retainers. The second 94 and third 95 tape retainers are then moved, such that the second tape retainer 94 is put next to the first tape retainer 93, the end of the magnetic tape 96 is joined to the previously cut end of the leader tape 92, and the remaining extracted tape is wound into the cassette case.

In addition to this, an apparatus with a different system of supplying magnetic tape to the severed leader tape has also been developed (Japanese Patent Publication No. 30444/1974). In this apparatus as well, leader tape is extracted from the cassette case, the leader tape is cut, and magnetic tape is joined to one end. After magnetic tape is wound into the cassette case, it is cut, and joined to the other end of the leader tape.

In former models that cut leader tape at a midpoint and splice it to magnetic tape, the leader tape extraction system is constructed such that the magnetic tape conviently utilizes one of the cassette case's internal tape tracking guides during the winding process. In other words, although magnetic tape is wound into the cassette case by tracking over one of the winding system's extraction guides or rollers, which is external to the cassette, it also tracks over the cassette case's internal tape guide, which is utilized during normal tape recording and playback. The winding system's extraction guides can be accurately machined precision equipment, which can track tape at high speeds without tape damage. The cassette case's internal tape guides, however, are restricted costwise, and therefore, cannot be precision machined.

For this reason, high speed magnetic tape winding processes, which utilize a cassette case internal tape guide, have a the drawback in that tape is easily damaged during winding, and high speed even winding is impossible.

Magnetic tape which is not evenly wound has uneven edges which protrude from the wound roll and hit the inside wall of the cassette case during movement or transport. This shock either breaks the edge of the tape or otherwise bends, scratches, or damages the tape.

SUMMARY OF THE INVENTION

The objective of the present invention is to provide an apparatus for winding magnetic tape into cassettes, which corrects the above drawbacks by altering the manner in which leader tape is extracted from the cassette case. This apparatus allows high speed winding without tape damage, even winding resulting in an even edged roll of tape, and reduction of winding time resulting in increased productivity.

A further objective of the present invention is to provide an apparatus for winding magnetic tape into cassettes, that exhibits an improved production efficiency. The amount of leader tape extracted from the cassette can be reduced, thus reducing the leader tape extraction time and final slack winding time. This reduction combined with the reduction in magnetic tape winding time discussed previously, facilitates drastic improvements with respect to the per part productivity.

DETAILED DESCRIPTION OF THE PREFERRED EMBODIMENTS

The following provides an illustrated description of the preferred embodiment(s) of the present invention.

Figure 1:
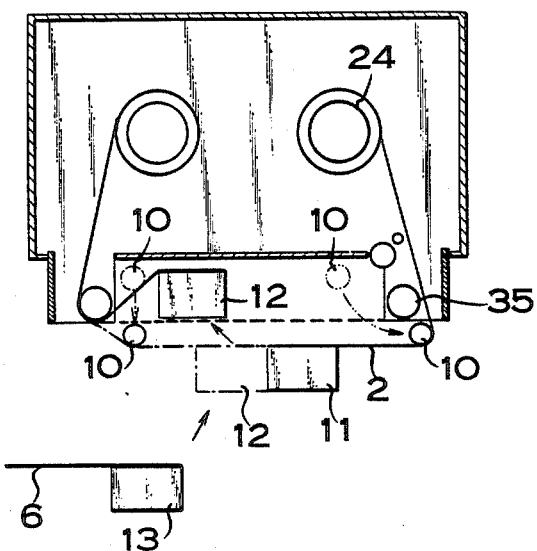
FIG. 1 is a front view.
Figure 2:
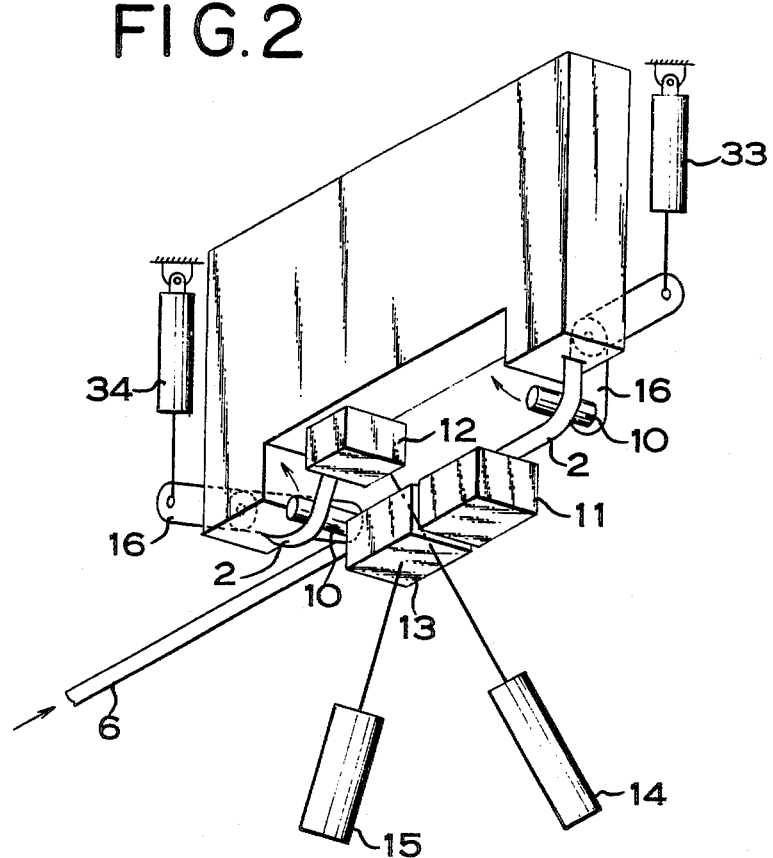
FIG. 2 is an oblique view showing, in outline form, the movement of the retaining means of an apparatus for winding tape into cassettes according to present invention.
Figure 3:
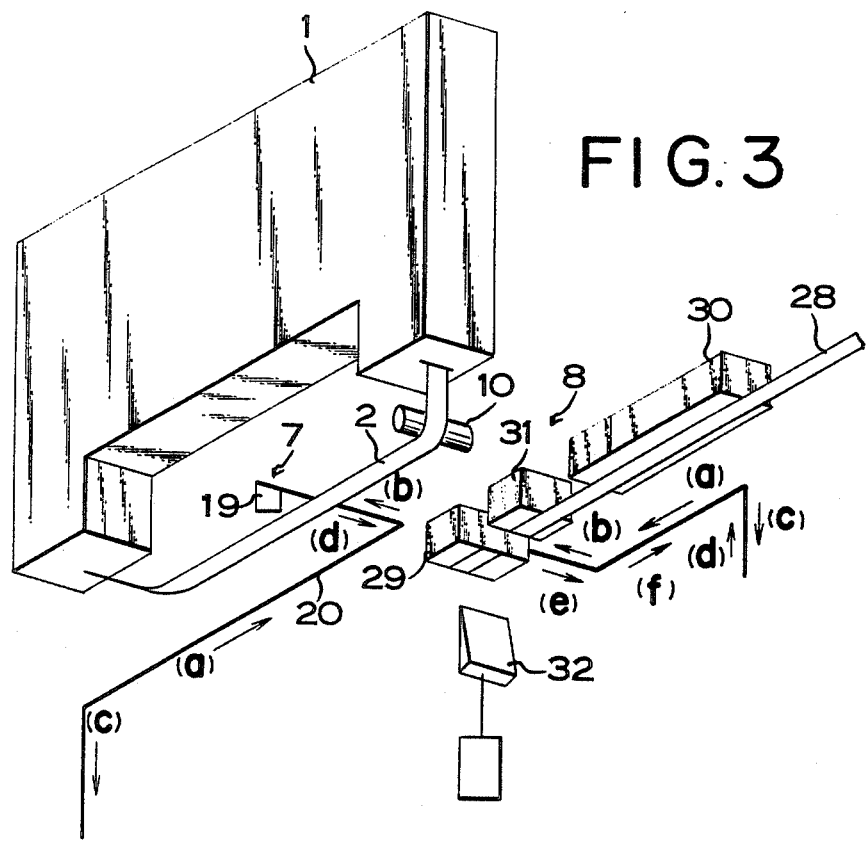
FIG. 3 is an abbreviated oblique view showing the cutting and splicing means according to present invention.

The device for winding cassettes with magnetic tape shown in FIG. 1 through FIG. 3 comprises: a retaining means, which holds an end of magnetic tape 6, as well as leader tape 2, unwound from a cassette case 1 secured at a set location by a positioning means (not illustrated); a cutting means 7, which cuts the leader tape 2 and magnetic tape 6 held by the retaining means; a splicing means 8, which joins the cut leader tape 2 and magnetic tape 6 by attaching splicing tape; and a winding means (not illustrated), which rotates one of the hubs 24, inside the cassette case, to wind up magnetic tape 6.

Figure 4:
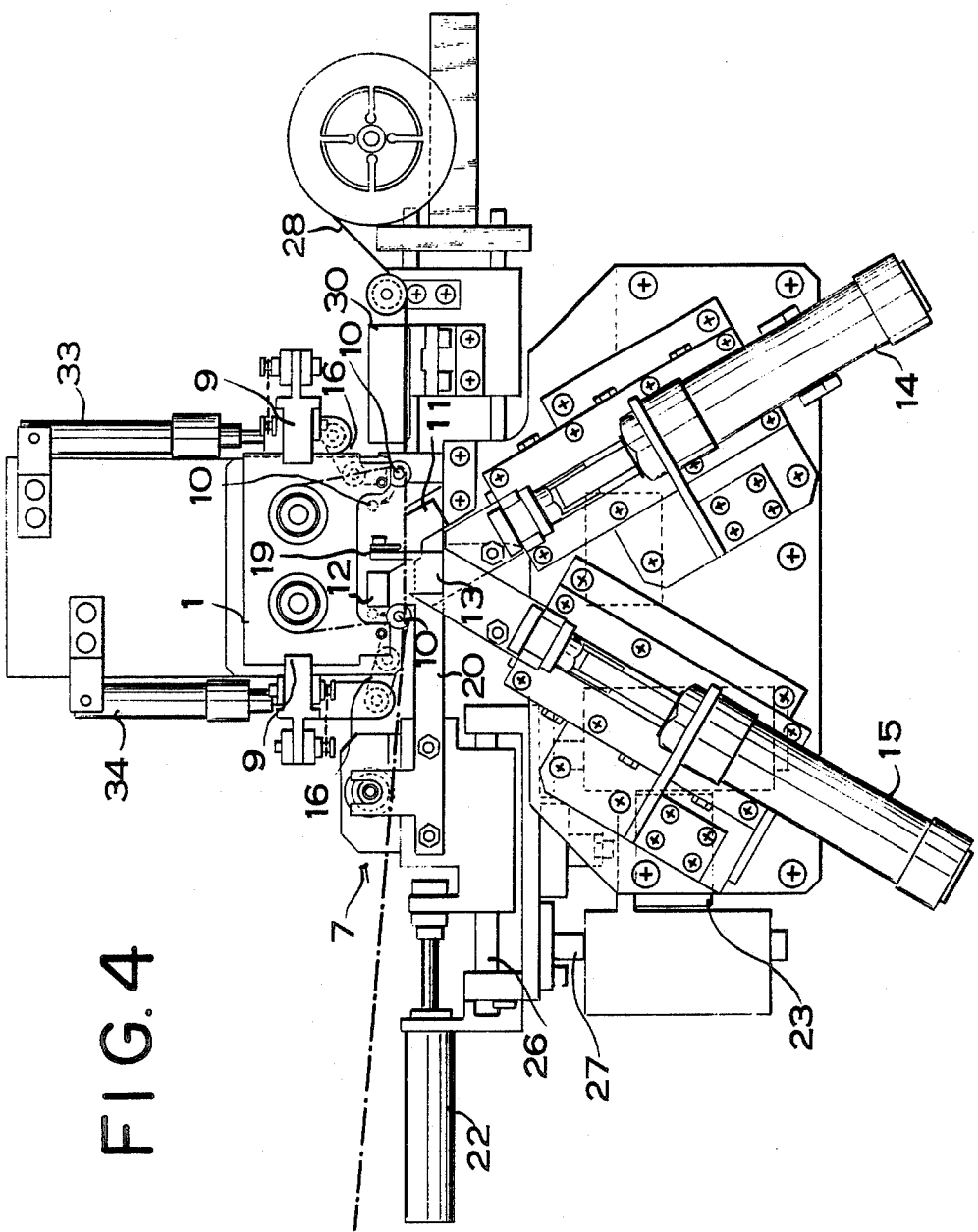
FIG. 4 is a detailed front view of a tape winding apparatus of an embodiment of the present invention.

The cassette case 1 positioning means has been used in conventional models. Any arrangement which can secure the cassette case in a fixed position, and can open the guard panel may be used. For example, an arrangement with claws 9 located on both sides of the cassette case, as shown in FIG. 4, can be used. The claws 9 apply pressure to grip the cassette case 1 by means of springs or other flexible media, or by means of a pressure cylinder.

The cassette case 1 guard panel opening apparatus is also a standard apparatus used in conventional models. For example, an apparatus which releases the guard panel lock and opens the guard panel with an arm or similar structure may be used.

The retaining means comprises: two tape extraction guides 10, which draw leader tape 2 from the cassette; a first 11, second 12, and third 13 tape retainer, which attach to the back side of the leader tape 2 and the magnetic tape 6; and two pressure cylinders 14 and 15 which move the second 12 and third 13 tape retainers.

The tape extraction guides 10 draw leader tape 2 from the cassette case 1 and guide it to the attachment surfaces of the first 11 and second 12 tape retainers. The two tape extraction guides 10 are fixed to two tape extraction arms 16, which constitute the extraction guide movable frames, in a manner that allows the arms freedom to rotate. The tape extraction guides 10 are moved by the tape extraction arms 16 from standby positions shown by the broken line in FIG. 4, to the winding positions shown by the solid line, thereby unwinding leader tape 2 from the cassette case 1.

When in the winding position, one of the extraction guides 10 serves as a tape tracking guide, instead of the cassette's internal tape guide, for winding magnetic tape 6 into the cassette case. Therefore, for winding magnetic tape, the right extraction guide 10 is positioned, as shown by the solid line position of FIG. 1, such that the path of the magnetic tape 6 into the cassette case 1 is spaced apart from the cassette case's internal tape guide 35.

As shown in FIG. 2, the tape extraction arms 16 are installed behind the cassette case 1, and are free to swing through an arc disposed in a vertical plane. One end of each tape extraction arm 16 is attached at a right angle to a tape extraction guide 10, while the other end is connected through a rod to a pressure cylinder. There are two pressure cylinders 33 and 34 which activate the two tape extraction arms 16.

The apparatus illustrated in FIG. 1 through FIG. 3 has two extraction guides 10, one of which (the rightmost) is used for tracking magnetic tape into the cassette case.

Although it is not illustrated, suction holes are provided on the upper (attachment) surfaces of the first 11, second 12, and third 13 tape retainers for the purpose of holding leader tape 2 and magnetic tape 6 in place. These suction holes are connected to a vacuum system.

Static electricity can be used in place of suction for the attachment of tape to the tape retainers 11, 12, and 13, etc.

The first tape retainer 11 is fixed to a stationary frame, while the second 12 and third 13 tape retainers connect to, and are moved by pressure cylinders 14 and 15.

Leader tape 2 is drawn from the cassette case 1 and is attached to the second tape retainer 12. As shown in FIG. 1 and FIG. 2, the second tape retainer 12 assumes a standby position inside the cassette case front cavity while the magnetic tape 6 winding process is performed.

The third tape retainer 13 attaches to the magnetic tape 6 only. It is moved to the position shown in FIG. 2 (the broken line position of FIG. 1) for facilitating the splicing of the magnetic tape 6 with the leader tape 2 and the winding thereof into the cassette case 1, and it is moved to the solid line position of FIG. 1 during leader tape cutting.

Figure 5:
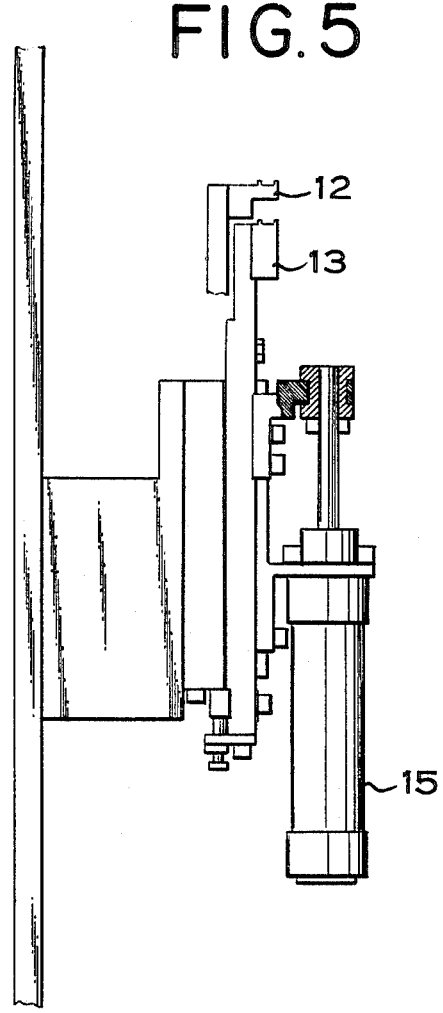
FIG. 5 is a side view showing the assembly for shuttling the second and third tape retainers of the present invention.

As shown in FIG. 2 and FIG. 4, the second 12 and third 13 tape retainers are fixed to the ends of rods connected to the pressure cylinders 14 and 15. As shown in FIG. 2 and FIG. 5, the second 12 and third 13 tape retainers are positioned to hold tape in the same vertical plane, however the pressure cylinder rod for the second tape retainer 12 is located in back of that for the third tape retainer 13 to allow independent movement.

Figure 6:
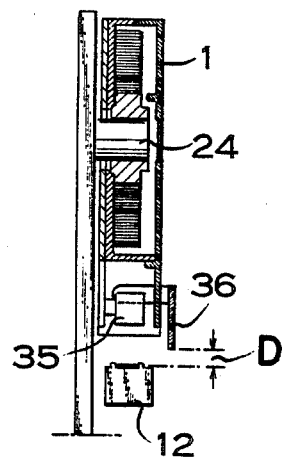
FIG. 6 is a side cutaway view showing a cassette case front cavity.

As shown in FIG. 6, while the first 11 and second 12 tape retainers hold the uncut leader tape 2, the area around the tape is covered by the cassette case 1 and the guard panel, thereby offering protection against dust and foreign objects. For this reason, the first 11 and second 12 tape retainers are located next to the cassette case guard panel at this stage.

In this case, the extracted leader tape 2 is surrounded by the first 11 and second 12 tape retainers, the guard panel, and the cassette case 1, and as shown in FIG. 6, a gap D occurs between the guard panel and the tape retainer attachment surfaces. The width of this gap D is, for example, 30 mm or less, more desirably 25 mm or less, and ideally 10 mm or less.

During the procedure of winding magnetic tape 6 into the cassette case 1, the second tape retainer 12 is moved out of the path of the magnetic tape 6, but its standby position is such that leader tape 2 is not exposed outside the cassette case 1 for a long period of time. Therefore, the standby position of the second tape retainer 12 is such that its attachment surface is, for example, 40 mm or less, and more desirably 35 mm or less from the guard panel.

As illustrated in FIG. 1 and FIG. 2, an ideal standby position for the second tape retainer 12 is within the cassette case front cavity. In this case, the leader tape 2 is surrounded by the tape retainer and the cassette case 1.

Figure 7:
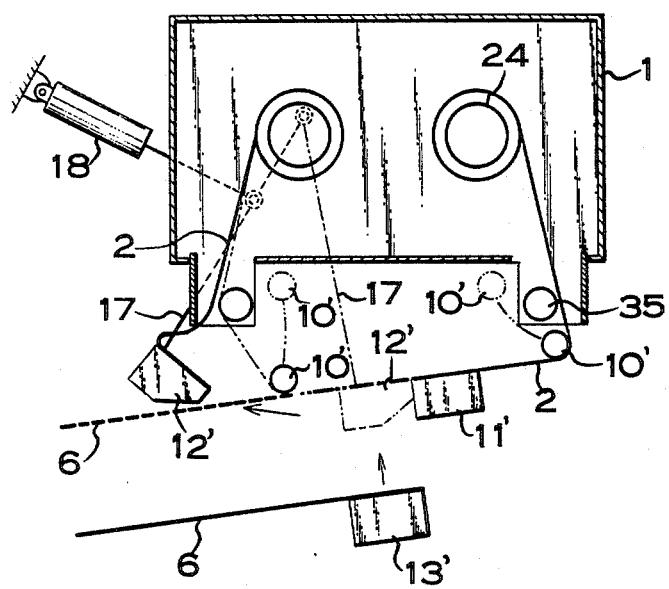
FIG. 7 is an abbreviated front view showing the tape retainer movement of another embodiment of the present invention.

The tape retainer 12' of the second embodiment of the present invention shown in FIG. 7 is fixed to the end of a rotating arm 17, which swings that tape retainer 12' from a position adjacent to the first tape retainer 11', in a direction away from the cassette case. The rotating arm 17 is activated by a pressure cylinder 18, and is installed behind the cassette case 1 to avoid interference with the cassette.

Figure 8:
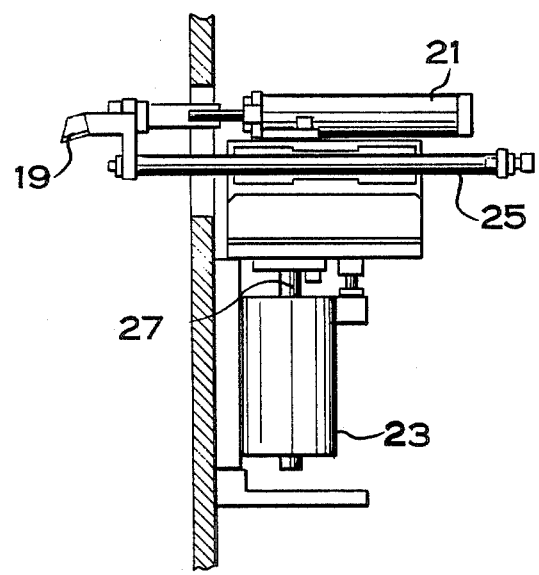
FIG. 8 is a side view showing the fore and aft movement of the cutter of the present invention.
Figure 9:
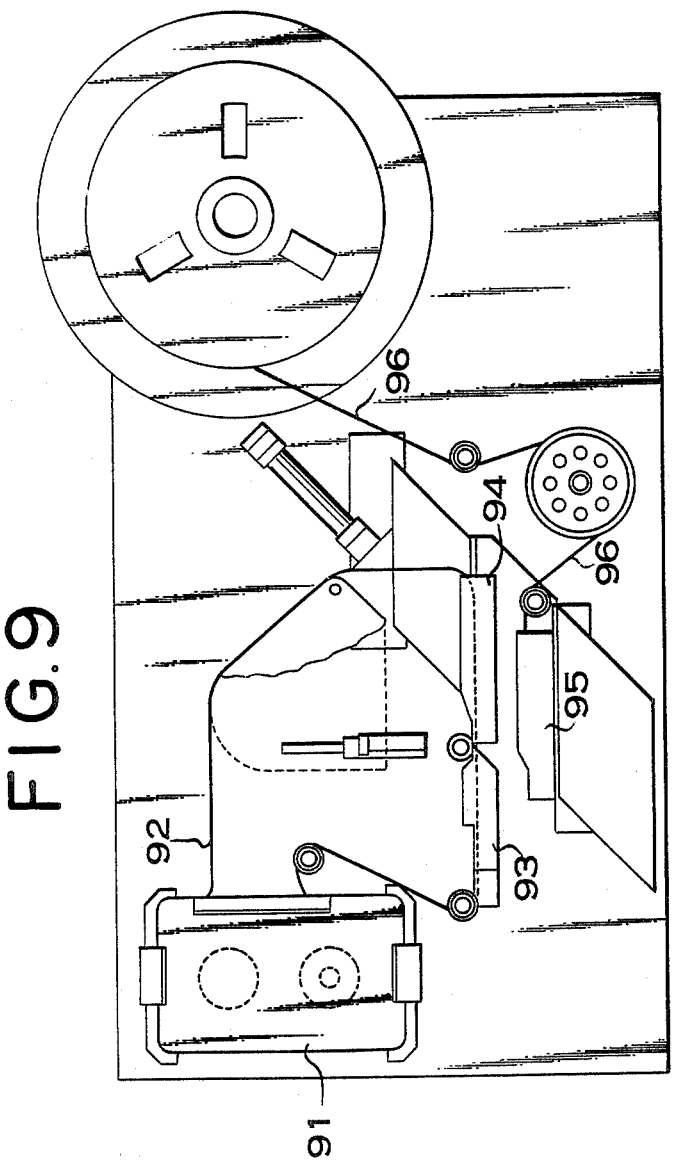
FIG. 9 is a front view of a specific example of a prior art tape winding apparatus.

As shown in FIG. 3, FIG. 4, and FIG. 8, the cutting means 7 comprises a cutter 19, a movable frame 20 which manipulates the cutter 19 to sever the tape, and refering to the orientation of the apparatus as shown in FIG. 4, a pressure cylinder 21 which moves the frame 20 for and aft, a pressure cylinder 22 which moves the frame 20 left and right, and a pressure cylinder 23 which moves the frame 20 up and down.

As shown in FIG. 4 and FIG. 8, the movable frame 20 is fixed to the end of the pushrod of the for and aft pressure cylinder 21. The for and aft cylinder 21 is fixed to the pushrod of the left and right pressure cylinder 22, which is in turn fixed to the pushrod of the up and down pressure cylinder 23. The up and down pressure cylinder is fixed to the stationary frame of the device.

The movable frame 20 is guided parallel to the guide bars 25, 26, and 27 in the for and aft, left and right, and up and down directions respectively.

Refering to FIG. 3, tape is cut by the cutter 19 as follows.

(a) The cutter 19, which is originally located behind the the tape, is moved to the right, to the cutting position at the center of the tape. The movable frame 20 is in the raised position during this operation.

(b) Next, with the cutter 19 still in the raised position, it is moved forward to a location on top of the tape 2 or 6.

(c) The cutter 19 is lowered to the surface of the tape for cutting.

(d) The cutter 19 is drawn back severing the tape 2 or 6.

As shown in FIG. 3 and FIG. 4 the splicing means comprises a pressure block 29, three pressure cylinders (not illustrated) to move the pressure block 29 fore and aft, left and right, and up and down, and a splicing tape supply system to deliver splicing tape 28 to the bottom surface of the pressure block 29. The pressure block 29 holds the splicing tape 28, which it presses onto the upper surfaces of the leader 2 and magnetic 6 tapes to perform a splice.

The pressure block 29 is constructed in the same manner as the movable frame 20 with three sets of pressure cylinders and guide bars. With splicing tape 28 attached to the bottom surface thereof, the pressure block 29 joins the tapes 2 and 6 as follows.

(a) While in the raised position, the pressure block 29 is moved to the left to line up with the splice line.

(b) Still in the raised position, the pressure block 29 is moved forward to a position on top of the tape.

(c) The pressure block 29 is lowered to the splice, and splicing tape 28 is pressed onto the leader 2 and magnetic 6 tapes to join them.

(d) The pressure block 29 is raised.

(e) The pressure block 29 is moved backward away from the tape.

(f) The pressure block 29 is moved to the right, returing to the standby position.

For each splice, steps (a) through (f) are repeated, thus joining the leader 2 and magnetic 6 tapes by attaching adhesive splicing tape to their upper surfaces.

The splicing tape supply system, which delivers a predetermined length of splicing tape 28 to the bottom surface of the pressure block 29 comprises a shuttle block 30 which draws splicing tape 28 off of a spool, an interim block 31 located between the shuttle block 30 and the pressure block 29, which attaches to the bottom surface of the end of the splicing tape 28, and a cutter 32 which cuts the splicing tape 28 at the surface of the pressure block facing the shuttle block 31.

The bottom attachment surfaces of the shuttle block 30, the interim block 31, and the pressure block 29 in the standby position are all aligned in, plane. Although it is not illustrated, the bottom surfaces of all these blocks have suction holes to allow attachment of the splicing tape 28. These suction holes are connected to a vacuum system through control valves.

With splicing tape 28 attached to its bottom surface, the shuttle block 30 is moved from the right to the left, delivering a fixed length of splicing tape to the interim block 31 and the pressure block 29. When the shuttle block 30 is moved from the left to the right, splicing tape 28 is released from the bottom of that block. At this point, the end of the splicing tape 28 is held attached to the bottom surfaces of the interim block 31 and the pressure block 30. The cutter 32 is raised to cut the thus held splicing tape 28 at the surface of the pressure block 29 facing the interim block 31.

During operation of the splicing means to join leader 2 and magnetic 6 tapes, the cutter 19, which severs either leader 2 or magnetic 6 tape, is withdrawn to a position out of the path of the pressure block 29.

The apparatus for winding magnetic tape into cassettes having the configuration described above, winds magnetic tape into cassettes in the following manner.

(1) The cassette case 1 is secured in a fixed position and the guard panel is opened.

(2) The tape extraction guides 10 inserted at the inner side of the exposed leader tape 2, draw the leader tape from the cassette case 1 and attach it to the upper surfaces of the first 11 and second 12 tape retainers. At this point, the first 11 and second 12 tape retainers are adjacent, with their attachment surfaces lined up in the same plane, and the third tape retainer 13 is in a standby location corresponding to the solid line position of FIG. 1.

(3) The cutter 19 severs the leader tape 2 between the first 11 and second 12 tape retainers. During this operation, the leader tape 2 is held attached to the first 11 and second 12 tape retainers.

(4) The second tape retainer 12 is moved away from the first tape retainer 11 to a standby position, while the third tape retainer 13 is moved adjacent to the first tape retainer 11, so that its upper surface is aligned in the same plane with that of the first tape retainer 11. At this stage also, leader tape 2 is held attached to the first 11 and second 12 tape retainers, and magnetic tape 6 is held attached to the third tape retainer 13.

(5) The leader tape 2 and magnetic tape 6, held on the adjacent and coplanar upper surfaces of first 11 and third 13 tape retainers, are joined together by the splicing means.

(6) Next, the spliced leader 2 and magnetic 6 tape is released from the first 11 and third 13 tape retainers, and the cassette hub 24, to which the leader tape 2 is attached, is rotated by the winding means to wind the connected magnetic tape 6 into the cassette case 1. During this operation, magnetic tape 6 is guided into the cassette case by the right extraction guide 10, and the cassette's internal tape tracking guide 35 is not used.

(7) After a predetermined length of magnetic tape 6 has been wound, the rotation of hub 24 is stopped, and the first 11 and third 13 tape retainers attach to the magnetic tape 6.

(8) The cutter 19 severs the magnetic tape 6 between the first 11 and third 13 tape retainers.

(9) The third tape retainer 13, with the magnetic tape 6 attached, is moved to its standby position shown by solid lines in FIG. 1, while the second tape retainer 12 is moved from its standby position to the position shown by broken lines in FIG. 1, adjacent to the first tape retainer 11.

(10) The end of the magnetic tape 6, held by the first tape retainer 11, is joined to the cut end of the leader tape 2 held by the second tape retainer 12 by the splicing means. In steps (8), (9), and (10) of this procedure, tape is held attached to the first, second, and third tape retainers 11, 12, and 13.

(11) Tape is released from the first 11 and second 12 tape retainers, and the extraction guides 10 are moved to the position shown by broken lines in FIG. 1.

(12) The hub 24 is rotated to take up slack tape into the cassette case 1.

(13) The cassette case 1 is replaced with another case not wound with magnetic tape.

This procedure is repeated and subsequent cassette cases are wound with magnetic tape.

In the apparatus of this invention shown in FIG. 4, the cassette case is oriented vertically with the cassette case front cavity facing downward. Leader tape extracted from the cassette case is surrounded by the cassette case, the guard panel, and the tape retainers, thereby protecting the leader tape from dust.

It is also possible to invert the apparatus of FIG. 4 so that the cassette case front cavity faces upward, and the upper surface of the extracted leader tape is covered by the tape retainers.

Regardless of the cassette case orientation, the specified relative position of the tape retainers with respect to the cassette case allows the extracted leader tape to be surrounded by the cassette case, the tape retainers, and the guard panel, and the leader tape is thus afforded protection against foreign object attachment.

Accordingly, the present invention does not limit the manner in which the cassette case is positioned.

The cassette case shown in FIG. 6 has a double bottom, such that the outermost panel is free to slide over the body of the cassette case and close off the hub openings when removed from the tape winding apparatus. Furthermore, closing the guard panel allows complete enclosure of the magnetic tape wound in the cassette. This type of cassette case provides for an extreme reduction in the amount of dust that gets on the magnetic tape after it has been wound into that cassette.

As shown in FIG. 1, the outside surface (the bottom surface as illustrated in FIG. 1) of leader tape, extracted from a cassette case held in place by a positioning means, is held adjacent to the cassette case's open guard panel by a retaining means. Leader tape extraction is performed by the extraction guide which unwinds leader tape by moving from the standby position, corresponding to the broken line position shown in FIG. 1, to the solid line winding position. The retaining means consits of separately movable first and second tape retainers to which the leader tape outside surface is attached and between which a cutter is inserted to sever the tape. The second tape retainer, shown on the left in FIG. 1, is moved to a new position separating the severed tape. This second tape retainer is not moved far from the cassette case front cavity, but rather is maintained next to the guard panel in a standby position that does not interfere with the splicing and cutting of magnetic tape.

The first and second tape retainers remain attached to the severed ends of the leader tape. An end of magnetic tape held by a third tape retainer is moved next to the end of the leader tape held by the first tape retainer, and the leader and magnetic tapes are joined by a splicing means. The spliced leader and magnetic tape is released from the tape retainers, a cassette reel hub is rotated, and magnetic tape is wound into the cassette.

At this point, the extraction guide is in the solid line position shown in FIG. 1, and from this position it guides magnetic tape directly onto the cassette's hub without contacting the internal tape tracking guide. When a set length of magnetic tape has been wound into the cassette, hub rotation is stopped, and the tape is attached to the first and third tape retainers. The cutter is inserted between the first and third tape retainers and the magnetic tape is cut. After the cutter is withdrawn from the tape cutting point, the third tape retainer is lowered to move a cut end of magnetic tape out of the way. Then the second tape retainer is lowered to line up the cut end of the leader tape with the other cut end of magnetic tape. The leader and magnetic tapes are joined together and are subsequently released from the first and second tape retainers. The extraction guides are moved from the winding position back to the standby position, and the cassette hub is rotated to wind in the slack magnetic and leader tape to the broken line position shown in FIG. 1.

In this manner, the extraction guide, which unwinds leader tape from the cassette case, doubles as a tape guide for tracking magnetic tape into the cassette case. Therefore, compared with former methods, which utilize one of the internal tape guides to track tape into the cassette, magnetic tape can be guided onto a cassette hub by an extraction guide, accurately machined with a precision surface having exceptional tracking stability, so that tape damage is negligible, tape is wound evenly, and the winding process is performed at high speeds.

Also, since the extraction guide which unwinds leader tape from the cassette case, doubles as a tape guide for tracking magnetic tape into the cassette, the overall structure of the apparatus can be simplified.

Furthermore, since the extraction guide, which unwinds leader tape from the cassette case, doubles as a tape guide for tracking magnetic tape into the cassette, the quantity of extracted leader tape can be small. Since the required quantity of leader tape extracted from the cassette case is extremely small, the total length of the leader tape can be short, and the nonrecordable tape length at both ends of the magnetic tape can also be short.

Furthermore, since the amount of movement of the tape extraction guide can be small, and since the amount of extracted leader tape is short, tape extraction guide movement time, tape extraction time, and final slack tape winding time can be reduced. Thus, improved productivity, in terms of processing time per cassette, is realized as an accompanying feature.

What is claimed is:

1. An apparatus for winding magnetic tape into a cassette having a rotatable hub therein around which hub leader tape is wound and to which leader tape the magnetic tape is attached and an internal tape guide over which tape guide the magnetic tape is guided to the hub once the magnetic tape is attached to the leader tape and wound into the cassette, said apparatus comprising:

extraction guide means for withdrawing leader tape from the cassette and for tracking and guiding the magnetic tape directly therefrom to the hub in the cassette after the magnetic tape is attached to the leader tape and during the time in which the magnetic tape is wound into the cassette; and movable frame means connected to said extraction guide means for moving the extraction guide means between a first standby position adjacent the leader tape of the cassette to a second winding position at which the leader tape is withdrawn from the cassette and displaced off of said internal tape guide so as to extend directly from said extraction guide means to the hub, the magnetic tape after being attached to the leader tape when the extraction guide means is in the second winding position being wound directly onto the hub without contacting the internal tape guide as the hub is rotated.

2. An apparatus for winding magnetic tape into a cassette as claimed in claim 1, wherein said movable frame means comprise extraction arms, and pressure cylinders operatively connected to said extraction arms for moving said extraction arms between position corresponding to said first standby position and said second winding position.

* * * * *